(12) United States Patent
Chan et al.

(10) Patent No.: US 8,095,816 B1
(45) Date of Patent: Jan. 10, 2012

(54) PROCESSOR MANAGEMENT USING A BUFFER

(75) Inventors: Ting Li Chan, Laguna Niguel, CA (US); Fredarico E. Dutton, Garden Grove, CA (US)

(73) Assignee: Marvell International Ltd., Hamilton (BM)

( * ) Notice: Subject to any disclaimer, the term of this patent is extended or adjusted under 35 U.S.C. 154(b) by 721 days.

(21) Appl. No.: 12/098,254

(22) Filed: Apr. 4, 2008

Related U.S. Application Data

(60) Provisional application No. 60/910,330, filed on Apr. 5, 2007.

(51) Int. Cl.
G06F 1/32 (2006.01)
G06F 1/00 (2006.01)
G06F 5/00 (2006.01)

(52) U.S. Cl. ............. 713/324; 713/300; 710/56; 710/57

(58) Field of Classification Search .................. 713/324, 713/300; 710/56, 57
See application file for complete search history.

(56) References Cited

U.S. PATENT DOCUMENTS

| | | | |
|---|---|---|---|
| 5,617,118 A * | 4/1997 | Thompson ..................... | 345/558 |
| 5,673,416 A * | 9/1997 | Chee et al. ..................... | 345/535 |
| 5,771,356 A * | 6/1998 | Leger et al. .................... | 709/233 |
| 5,828,835 A * | 10/1998 | Isfeld et al. .................... | 709/200 |
| 5,884,099 A * | 3/1999 | Klingelhofer .................. | 710/52 |
| 6,014,722 A * | 1/2000 | Rudin et al. ................... | 710/240 |
| 6,092,108 A * | 7/2000 | DiPlacido et al. ............. | 709/224 |
| 6,330,626 B1 * | 12/2001 | Dennin et al. .................. | 710/52 |
| 6,711,447 B1 * | 3/2004 | Saeed .............................. | 700/82 |
| 6,756,988 B1 * | 6/2004 | Wang et al. .................... | 345/558 |
| 6,823,472 B1 * | 11/2004 | DeKoning et al. ............. | 714/10 |
| 6,832,280 B2 * | 12/2004 | Malik et al. .................... | 710/200 |
| 7,103,788 B1 | 9/2006 | Souza et al. | |
| 7,194,638 B1 | 3/2007 | Larky | |
| 7,308,591 B2 * | 12/2007 | Dubinsky ....................... | 713/324 |
| 7,496,952 B2 | 2/2009 | Edwards et al. | |
| 7,596,614 B2 | 9/2009 | Saunderson et al. | |
| 7,774,635 B2 * | 8/2010 | Shiota ............................ | 713/500 |
| 7,788,670 B2 * | 8/2010 | Bodas et al. ................... | 718/105 |
| 2002/0069354 A1 | 6/2002 | Fallon et al. | |
| 2002/0087816 A1 | 7/2002 | Atkinson et al. | |
| 2003/0208675 A1 | 11/2003 | Burokas et al. | |
| 2004/0266386 A1 | 12/2004 | Kuo | |
| 2005/0033869 A1 | 2/2005 | Cline | |
| 2005/0055547 A1 | 3/2005 | Kawamura | |
| 2005/0086551 A1 | 4/2005 | Wirasinghe et al. | |

(Continued)

FOREIGN PATENT DOCUMENTS

EP 1847911 10/2007

OTHER PUBLICATIONS

"Extensions to Direct Link Setup (DLS) Comments", *IEEE*, P802.11z, (Jul. 2009), pp. 1-3.

(Continued)

*Primary Examiner* — Mark Rinehart
*Assistant Examiner* — Christopher A Daley

(57) ABSTRACT

In an embodiment, an apparatus comprises a buffer, a plurality of processors, and a processor control module. The processor control module is to manage how many of the plurality of processors are used to process data from the buffer based at least in part on an amount of the data stored in the buffer.

27 Claims, 8 Drawing Sheets

U.S. PATENT DOCUMENTS

| | | | |
|---|---|---|---|
| 2006/0142906 | A1 | 6/2006 | Brozovich et al. |
| 2007/0234028 | A1 | 10/2007 | Rothman et al. |
| 2007/0260905 | A1 | 11/2007 | Marsden et al. |
| 2007/0277051 | A1 | 11/2007 | Reece et al. |
| 2008/0034411 | A1 | 2/2008 | Aoyama |
| 2008/0104422 | A1 | 5/2008 | Mullis et al. |
| 2008/0120717 | A1 | 5/2008 | Shakkarwar |
| 2008/0298289 | A1 | 12/2008 | Jeyaseelan |
| 2009/0006658 | A1 | 1/2009 | Gough |
| 2009/0049222 | A1 | 2/2009 | Lee et al. |
| 2009/0199031 | A1 | 8/2009 | Zhang |
| 2010/0070751 | A1 | 3/2010 | Chue |
| 2010/0174934 | A1 | 7/2010 | Zhao |

OTHER PUBLICATIONS

"Final Office Action", U.S. Appl. No. 12/178,268, (May 25, 2011), 13 pages.

"Non-Final Office Action", U.S. Appl. No. 12/101,668, (Apr. 5, 2011),7 pages.

"Non-Final Office Action", U.S. Appl. No. 12/178,268, (Dec. 22, 2010), 10 pages.

"Part 11—Wireless LAN Medium Access Control (MAC) and Physical Layer (PHY) Specifications", *Information Technology—Telecommunications & Information Exchange Between Systems... International Standard*, ISO/IEC 8802-11, First Ed., (1999), pp. 1-531.

"PCT Partial Search Report", U.S. Appl. No. PCT/US2008/078343, Partial International Search,(Mar. 5, 2009), 2 pages.

"PCT Search Report and Written Opinion", Application No. PCT/US2009/067767, (Mar. 26, 2010), 12 pages.

"PCT Search Report", Application No. PCT/US2009/056973, (Nov. 4, 2009), 13 pages.

"PCT Search Report", Application Serial No. PCT/US2008/078343, (May 18, 2009), 5 pages.

* cited by examiner

PROCESSOR MANAGEMENT USING A BUFFER

RELATED APPLICATION

This application claims priority under 35 U.S.C. §119(e) to U.S. Provisional application Ser. No. 60/910,330, filed on Apr. 5, 2007, the entire disclosure of which is hereby incorporated by reference.

BACKGROUND

A variety of different techniques have been developed to increase the amount of processing resources that are available to a computing device. One such technique involves the use of multiple processors. For example, a single integrated circuit may be configured to include multiple processors (e.g., processor cores), thereby providing increased processing resources for a computing device that employs the integrated circuit. However, the use of multiple processors traditionally resulted in increased power consumption, which may make use of multiple processors less suitable in certain configurations.

For instance, a computing device may be configured for an office environment and therefore have access to an external power source. In another example, however, the computing device may be configured for mobile applications and therefore may not have ready access to an external power source. Consequently, a computing device configured for use in mobile applications may also incorporate a power source (e.g., a battery) that may be considered limited when compared to the external power source. For example, the amount of power that may be obtained from the battery by the processor and other resources of the computing device may be limited. Therefore, this limited power may make traditional multiprocessor techniques unsuitable for mobile applications.

SUMMARY

This Summary is provided solely to introduce subject matter that is fully described in the Detailed Description and Drawings. Accordingly, the Summary should not be considered to describe essential features nor used to determine scope of the claims.

In an embodiment, an apparatus comprises a buffer, a plurality of processors, and a processor control module. The processor control module is to manage how many of the plurality of processors are used to process data from the buffer based at least in part on an amount of the data stored in the buffer.

In an embodiment, a method comprises determining by a processor control module an amount of data stored in a buffer. The processor control module manages how many of a plurality of processors are to be used to process the data from the buffer based at least in part on the determined amount of the data stored in the buffer.

In an embodiment, a method comprises determining that an amount of data stored by buffer exceeds a threshold. Responsive to the determining, one or more additional processors are activated by a processor control module to process at least a portion of the data.

In an embodiment, a system comprises means for buffering data and a plurality of means for processing the data, each being communicatively coupled to the buffering means. The system also comprises means for managing how many of the processing means are to be used to process the data from the buffering means based at least in part on an amount of the data is stored in the buffering means.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Processor management using a buffer is described. In an implementation, a processor control module manages how many of a plurality of processors are to be used to process data from a buffer based on an amount of data stored in the buffer. For example, a first in/first out (FIFO) buffer may be used to store packets in a packet processing environment for subsequent processing by a plurality of processors. Thresholds may be defined for the buffer, each defining a respective amount of storage space in the buffer. These thresholds may then be used as a basis for activating or deactivating one or more of the processors, thereby assuring that an appropriate number of processors are available to handle a processing load. Further, power consumed by the processors may be conserved by using an appropriate number of the processors.

For instance, a processor control module may determine that an amount of data stored in the buffer has increased, thereby causing a threshold to be exceeded. In response to this determination, the processor control module may activate one or more additional processors, thereby addressing the increased amount of data. Likewise, when the amount of data decreases such that the amount stored in the buffer falls below a particular threshold, one or more processors that are active may be deactivated. In this way, a number of processors used to process the data and the amount of data to be processed correspond, thereby resulting in an efficient use of resources and efficient power consumption. Further discussion of power management using a buffer may be found in relation to the following discussion.

In the discussion that follows, example operating environments are described that may incorporate the processor management techniques. Example procedures are also described that may be employed in the example operating environments, as well as other environments. Thus, in instances in the discussion of the example procedures reference will be made to the example environments by way of example. Therefore, implementation of the example procedures is not limited to the example environments.

Operating Environment

Figure 1:
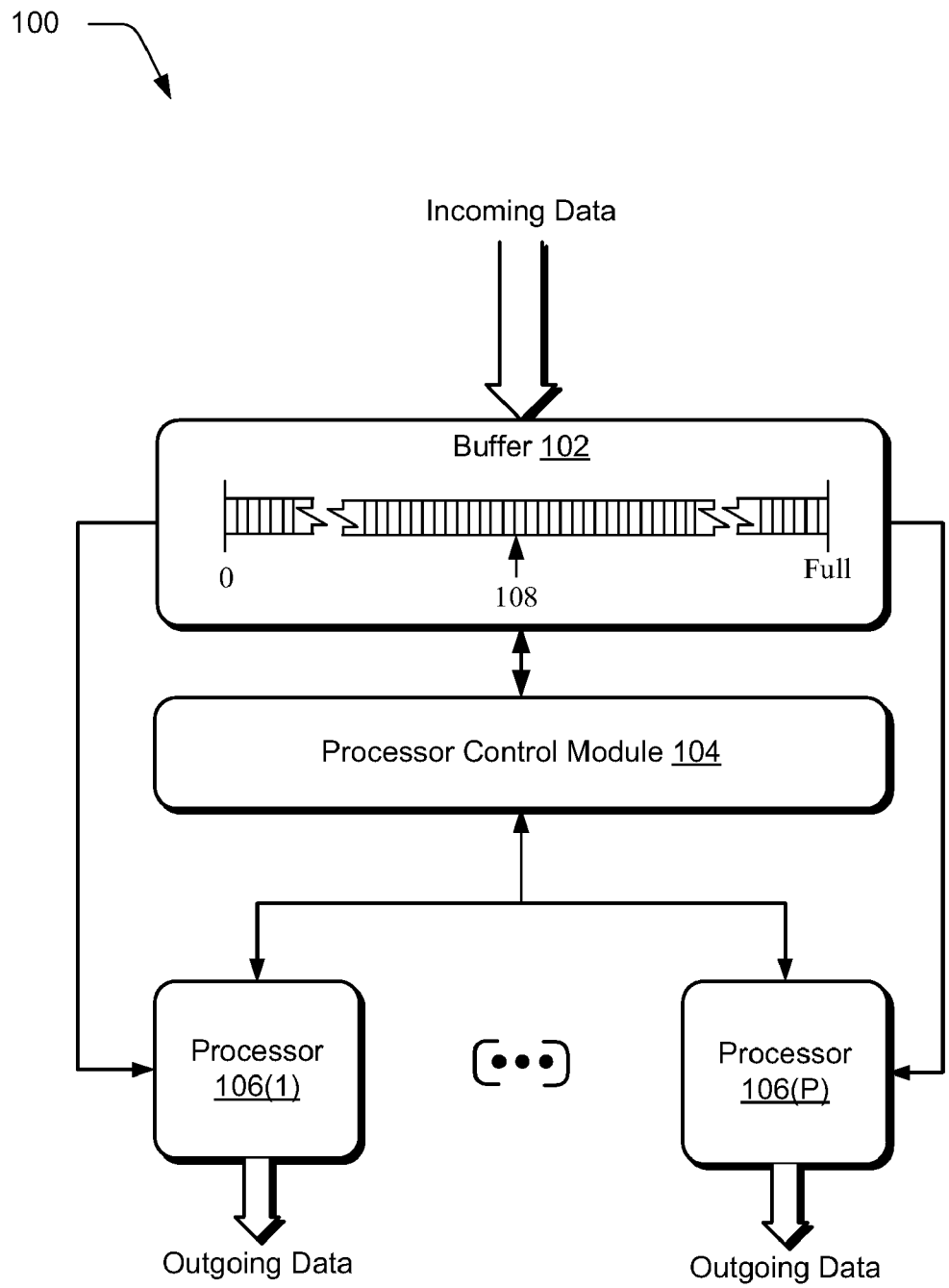
FIG. 1 is an illustration of an example operating environment that is configured to employ techniques to manage processors using a buffer.

FIG. 1 depicts an environment 100 in an example implementation that is configured to employ techniques to manage processors using a buffer. The environment 100 includes a buffer 102, a processor control module 104 and a plurality of processors 106(1)-106(P). The processor control module 104 is illustrated as being communicatively coupled to the buffer 102 and the plurality of processors 106(1)-106(P).

The buffer 102 may be configured in a variety of ways. For example, the buffer 102 may represent a logical buffer that is formed using a plurality of buffer devices. Additionally, in this example, the plurality of buffer devices may be configured in a variety of ways, e.g., formed from a single integrated circuit or a plurality of integrated circuits. A variety of other examples are also contemplated.

The buffer 102 is illustrated in FIG. 1 as receiving incoming data, which may then be provided to one or more of a plurality of processors 106(1)-106(P). The buffer 102 may be configured in a variety of ways that determine when the data stored in the buffer 102 is to be provided to the plurality of processors 106(1)-106(P), e.g., by configuring the buffer 102 as a first in/first out (FIFO) buffer and so on.

The buffer 102 is further illustrated in FIG. 1 as depicting a relative amount of data that may be stored in the buffer e.g., from "0" to "Full". In an implementation, the data is stored in the buffer 102 as packets, each of which is subsequently provided to a respective one of a plurality of processors 106(1)-106(P) for processing. A result of the processing may then be output by the respective one of the plurality of processors 106(1)-106(P) (e.g., which is illustrated as "outgoing data" in FIG. 1), such as to an application that requested the processing, to another application for further processing, for storage in memory of a computing device, for communication over a network connection (e.g., a wireless connection and/or the Internet), and so on.

The plurality of processors 106(1)-106(P) may also be configured in a variety of ways. Consequently, processors 106(1)-106(P) are not limited by the materials from which they are formed or the processing mechanisms employed therein. For example, processors 106(1)-106(P) may be comprised of one or more semiconductor(s) and/or transistors (e.g., electronic integrated circuits (ICs)). Alternatively, the mechanisms of or for processors 106(1)-106(P) may include, but are not limited to, quantum computing, optical computing, mechanical computing (e.g., using nanotechnology), and so forth.

For example, the processors 106(1)-106(P) may be configured to provide a central processing unit (CPU) of a computer, to provide processing for a peripheral device communicatively coupled to a computer (e.g., a graphics card), and so on. Further, the plurality of processors 106(1)-106(P) may be configured from one or more devices, e.g., from a single integrated circuit having a plurality of processor cores, a plurality of integrated circuits, and so on. Thus, it should be readily apparent that the processors 106(1)-106(P) may be representative of a variety of different functionality to interpret and execute instructions, perform arithmetic and the logic operations on data, control input/output functions, and so on.

The processor control module 104 is representative of functionality in the environment 100 of FIG. 1 to manage the processors 106(1)-106(P). For example, the processor control module 104 may be configured to provide different amounts of processing resources by activating and/or deactivating one or more of the plurality of processors 106(1)-106(P). The processor control module 104 may provide the different amounts of processing resources in response to a wide variety of considerations.

The processor control module 104, for instance, may provide dynamic management of the processors 106(1)-106(P). For example, processor 106(P) may be made "active" by the processor control module 104 such that it is suitable to process data, e.g., accept, interpret and/or execute instructions as previously described. Likewise, processor control module 104 may make the processor 106(P) "inactive" such that the processor 106(P) is not suitable to process data. Consequently, the processor control module 104 may also control an amount of power consumed by the plurality of processors 106(1)-106(P) by activating and/or deactivating one or more of the plurality of processors 106(1)-106(P). For instance, power consumed by the processor 106(P) when inactive may be significantly less than the power consumed by the processor 106(P) while active, even if the processor 106(P) is not engaged in active execution of instructions. Thus, the terms active and inactive as used herein describes whether the respective processor is available or unavailable to perform processing, respectively, e.g., but does not actively have to do so to be active.

Dynamic management of the processors 106(1)-106(P) may then be utilized by the processor control module 104 to ensure that an appropriate number of the processors 106(1)-106(P) are available to handle a current and/or expected processing load. For example, threshold 108 may define an amount of storage in the buffer 102. The threshold 108 may be set in a variety of ways. The threshold 108 may be used as a "watermark" to define a transition between respective amounts of processing resources to be provided by the plurality of processors 106(1)-106(P).

An amount of data stored in the buffer 102, for instance, may be less than the threshold 108 such that the processor 106(1) by itself may adequately process the data, e.g., the processing may be adequately performed without processor 106(P). Consequently, the processor control module 104 may keep processor 106(1) active to process the data in the buffer 102 and may make processor 106(P) inactive to conserve resources, e.g., power.

When the incoming data received by the buffer 102 causes an amount of data stored in the buffer 102 to exceed the threshold 108, the processor control module 104 may activate processor 106(P) to handle the increased processor load that is stored in the buffer 102. Similar techniques may also be used to deactivate the processor 106(P) when the amount of data stored in the buffer 102 becomes less than the threshold 108. Thus, in this example the processor control module 104 may provide an appropriate level of processing resources based on an amount of data stored in the buffer 102. Although the discussion of the environment 100 of FIG. 1 involves use of a single threshold 108, it should be readily apparent that a plurality of thresholds may be used to manage how many of the plurality of processors 106(1)-106(P) are to be used to process the data of the buffer 102. Additionally, it should also be readily apparent that the threshold 108 may correspond to more than one processor, e.g., to activate or deactivate multiple processors. Further discussion of processor management techniques using a plurality of thresholds, each of which may correspond to one or more processors may be found in relation to the following figure.

Figure 2:
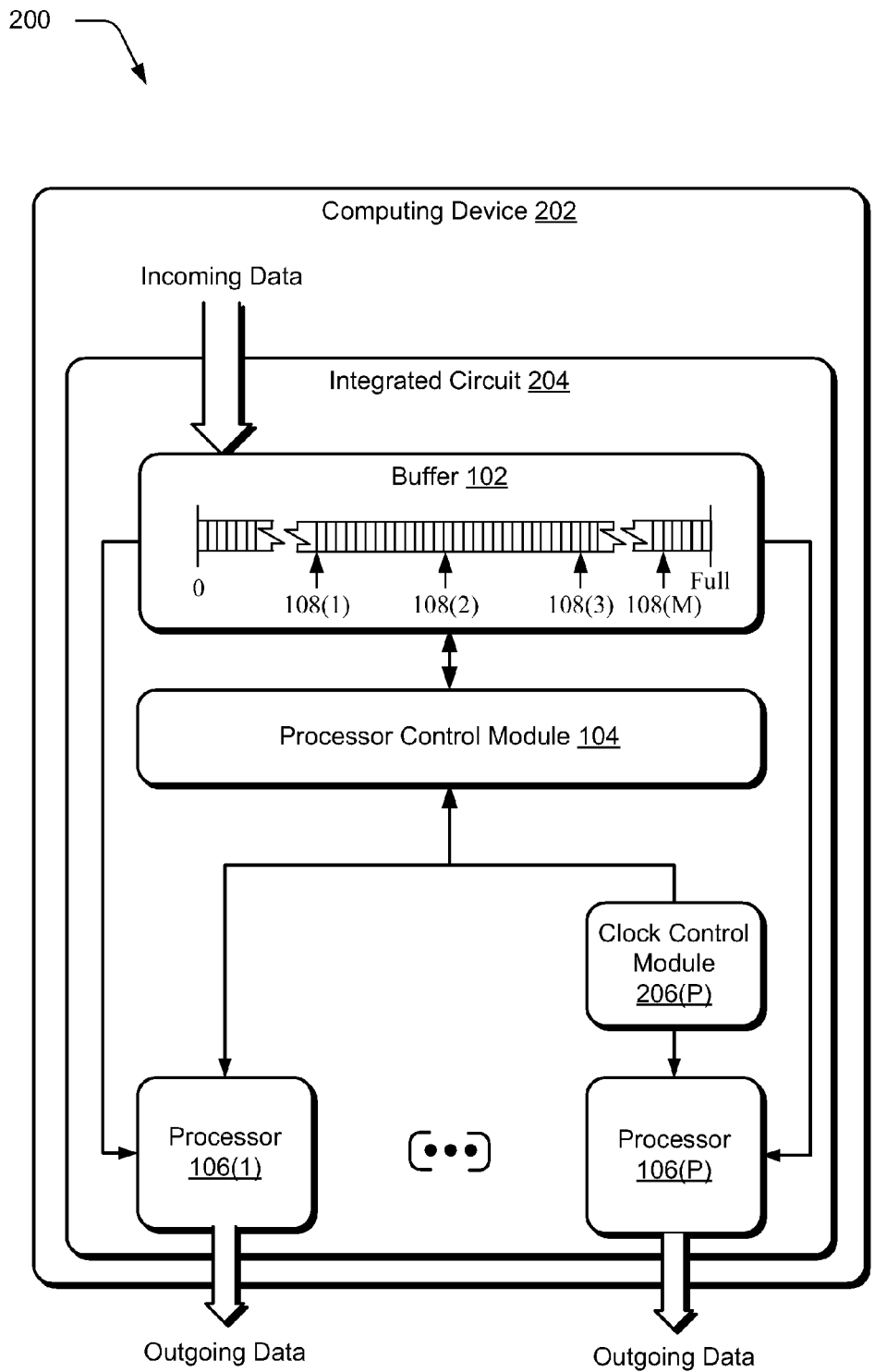
FIG. 2 depicts a system in an example implementation in which a buffer, a processor control module and a plurality of processors of FIG. 1 are illustrated as within a computing device.

FIG. 2 depicts a system 200 in an example implementation in which the buffer 102, the processor control module 104 and the plurality of processors 106(1)-106(P) of FIG. 1 are illustrated as within a computing device 202. The computing device 202 may be configured in a variety of ways, examples of which are illustrated by devices which may be found in the related discussion of FIGS. 5-12.

A single integrated circuit 204 is illustrated as including the buffer 102, the processor control module 104 and the processors 106(1)-106(P). For example, the single integrated circuit 204 may be configured as an application specific integrated circuit (ASIC). A variety of other examples are also contemplated as previously described in relation to FIG. 1.

The buffer 102 is illustrated as including a plurality of thresholds 108(1)-108(M). As previously described, each of the plurality of thresholds 108(1)-108(M) may define a respective amount of storage of the buffer 102. Additionally, each of the thresholds 108(1)-108(M) may correspond to an amount of processing resources that is to be activated or deactivated by the processor control module 104 by activating or deactivating one or more processors 106(1)-106(P). For example, threshold 108(1) may define an amount of processing resources that correspond to two or more of the plurality of processors 106(1)-106(P). Therefore, in this example when threshold 108(1) is exceeded two or more of the processors 106(1)-106(P) may be activated. A variety of other examples are also contemplated, e.g., three processors, four processors, five processors, and so on.

Further, the amount of processing resources to be activated or deactivated by successive thresholds may differ, one to another. For example, threshold 108(3) may correspond to an amount of processor resources that may be satisfied by a single one of the processors 106(1)-106(P) while threshold 108(M) may correspond to an amount of processor resources that is to be satisfied by two or more of the plurality of processor 106(1)-106(P). Thus, it should be noted that the number of a plurality of thresholds 108(1)-108(M) may or may not correspond to the number of processors 106(1)-106(P). In other words, "M" may or may not be less than or equal to "P".

In an implementation, at least one of the processors 106(1)-106(P) is not activated or deactivated based on the amount of data stored in the buffer 102. For example, processor 106(1) may be configured as a "parent" processor that remains active no matter what amount of data is included in the buffer 102. On the other hand, processor 106(P) may be configured as a "child" processor that is activated or deactivated by the processor control module 104 based on the amount of data stored in the buffer 102. Thus, in this example the processor management techniques that involve the buffer are applied to processor 106(P) and not processor 106(1). A variety of other examples are also contemplated, such as by designating multiple processors as a "parent" and so on.

The processor control module 104 may utilize a variety of techniques to activate or deactivate the plurality of processors 106(1)-106(P). For example, processor 106(P) is illustrated as being associated with a clock control module 206(P). The clock control module 206(P) is representative of functionality to enable or disable a clock of the corresponding processor 106(P). In other words, the clock control module 206(P) may "turn on" or "turn off" the clock of the processor 106(P) to enable or disable the processor 106(P), respectively. Therefore, the processor control module 104 may communicate with the clock control module 206(P) of the corresponding processor 106(P) to enable or disable its clock, thereby activating or deactivating the corresponding processor 106(P). Although the clock control module 206 as illustrated separately in FIG. 2, the clock control module 206 may be configured in a variety of ways, such as integral part of the processor control module 104, the processor 106(P) itself, and so on. Further, the "clock" that is being turned off may also be configured as an external clock. Therefore, in this example the clock control module 206 may control whether a clock signal is propagated to the corresponding processor 106(P). A variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the processor management techniques described below are platform-independent, meaning that the techniques may be implemented on a variety of commercial computing platforms having a variety of processors.

Example Procedures

Figure 3:
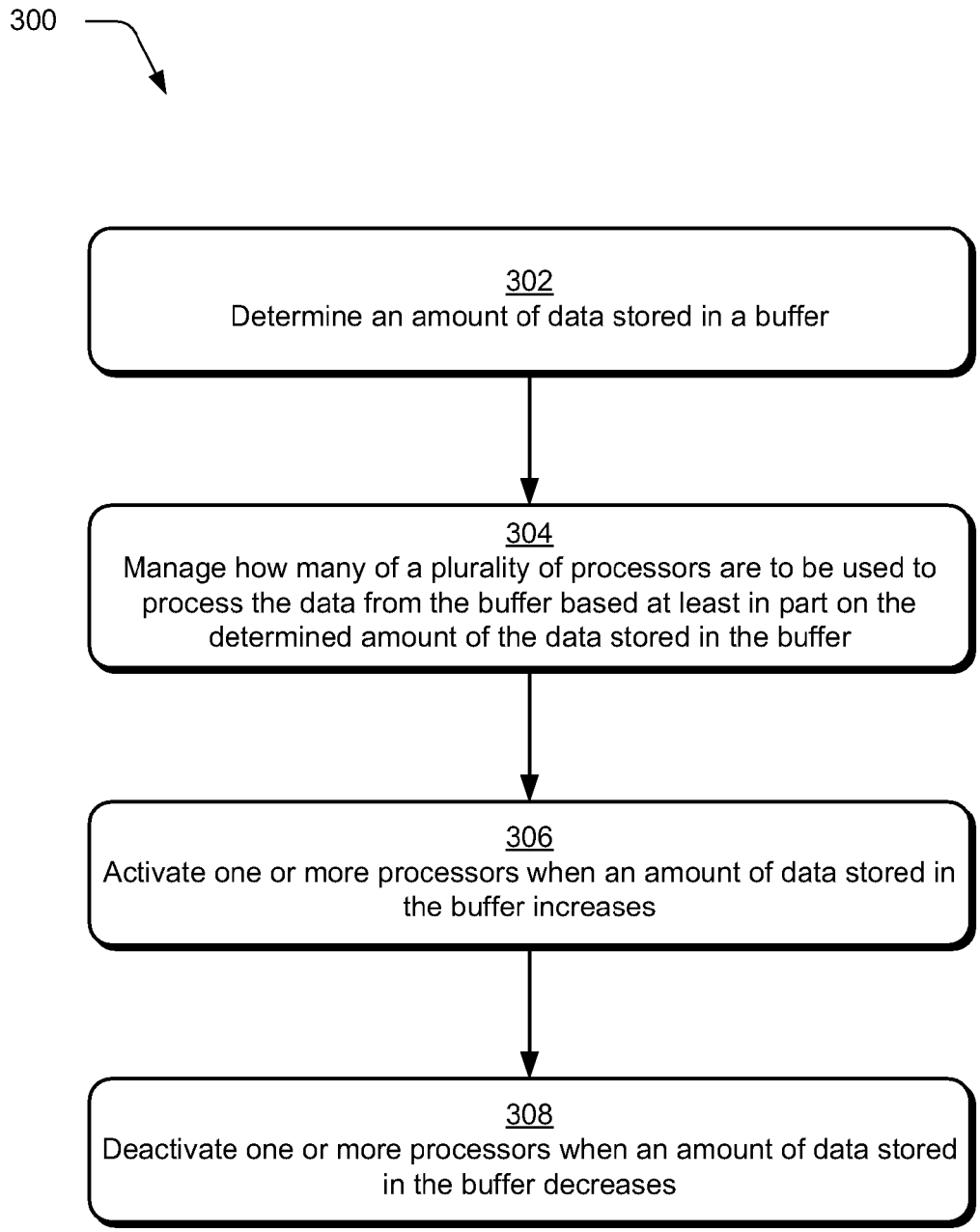
FIG. 3 is a flow diagram that depicts a procedure in an example implementation in which techniques are described to manage processors using a buffer.

FIG. 3 depicts a procedure 300 in an example implementation in which techniques are described to manage processors using a buffer. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

An amount of data stored in a buffer is determined (block 302). For example, the processor control module 104 may monitor the buffer 102 to determine an amount of data stored in the buffer 102. In another example, the buffer 102 may include functionality that "reports" the amount of data currently stored in the buffer 102 to the processor control module 104. For instance, the functionality in the buffer 102 may report when one or more of the plurality of thresholds 108(1)-108(M) are crossed. A variety of other instances are also contemplated.

How many of a plurality of processors that are to be used to process the data from the buffer is managed, at least in part, based on the determined amount of the data stored in the buffer (block 304). The processor control module 104, for instance, may add processing resources by activating processors as the amount of data in the buffer 102 increases (block 306). In another instance, one or more processors may be deactivated as an amount of data stored in the buffer 102 decreases (block 308). In this way, the amount of data stored in the buffer 102 may be used to indicate to the processor control module 104 an upcoming/current processor load. The processor control module 104 may therefore react accordingly by activating or deactivating one or more of a plurality of processors 106(1)-106(P). A variety of different techniques may be used to activate or deactivate the plurality of processors 106(1)-106(P), further discussion of which may be found in relation to the following figure.

Figure 4:
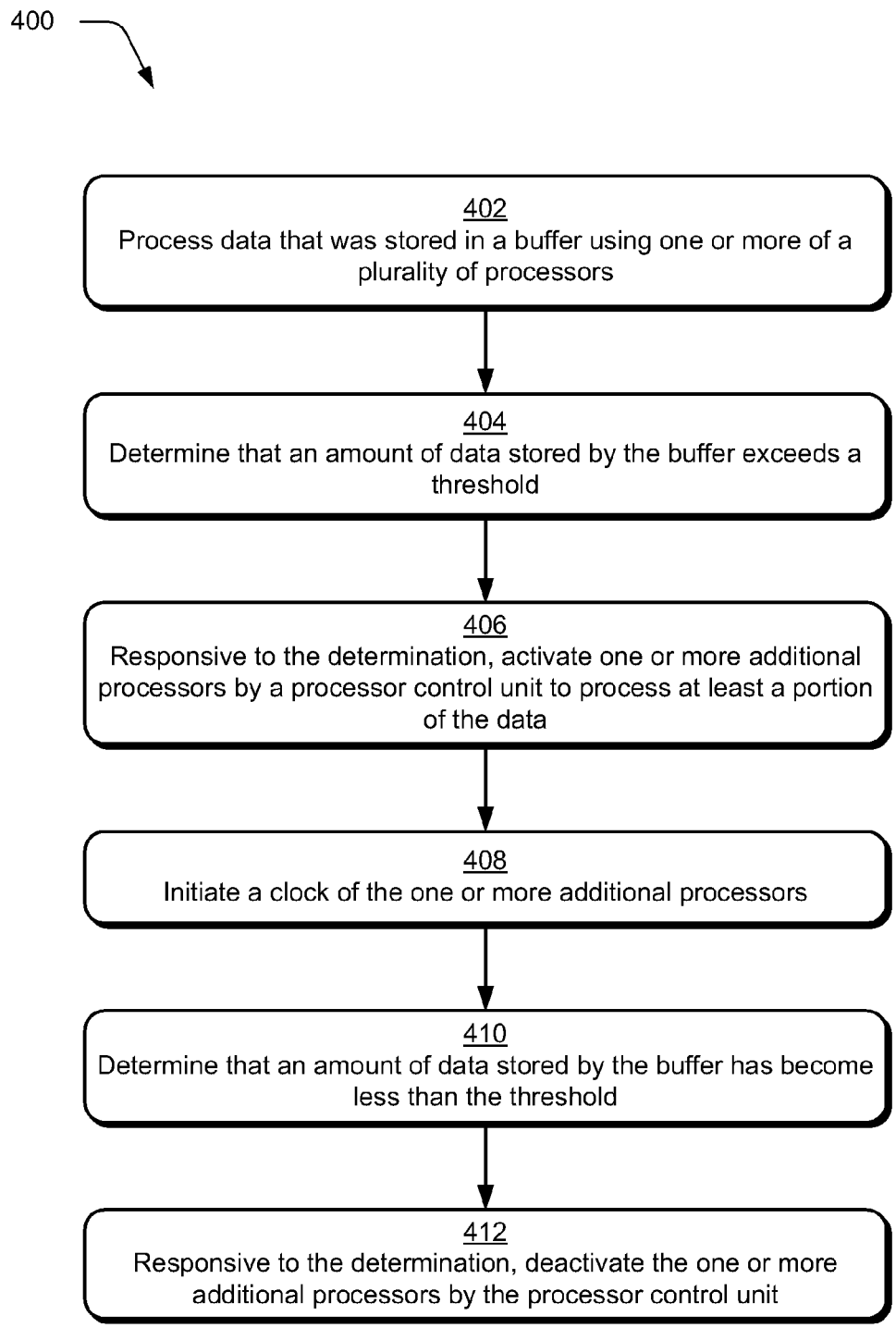
FIG. 4 is a flow diagram that depicts a procedure in an example implementation in which techniques are described to manage processors using one or more thresholds that define respective amounts of storage space in a buffer.

FIG. 4 depicts a procedure 400 in an example implementation in which techniques are described to manage processors using one or more thresholds that define respective amounts of storage space in a buffer. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Data that was stored in a buffer is processed using one or more of a plurality of processors (block 402). The plurality of processors 106(1)-106(P), for instance, may receive packets of data from the buffer 102.

A determination is made that an amount of data stored by the buffer exceeds a threshold (block 404). The processor control module 104, or example, may determine that the amount of data stored in the buffer 102 now exceeds a threshold 108 that was not previously exceeded.

Responsive to the determination, one or more additional processors are activated by a processor control module to process at least a portion of the data (block 406). The one or more additional processors may be activated in a variety of ways, such as by initiating one or more respective clocks of the processors (block 408). For example, the processor control module 104 may communicate with the clock control module 206(P) to activate processor 106(P) by starting the processor's clock. Thus, the processor 106(P) is "active" and ready to accept instructions and/or data.

A determination may also be made, e.g., at a subsequent time, that an amount of data stored by the buffer has become less than a threshold (block 410). Continuing with the previous example, the one or more additional processors may help to relieve the processor load caused by the data that is stored in the buffer 102 "over" the threshold 108. Therefore, the amount of data stored in the buffer 102 may become less than the threshold 108.

Responsive to the determination, the one or more additional processors are deactivated by the processor control module (block 412). Continuing again with the previous example, the processor control module 104 may communicate with the clock control module 206(P) to stop the clock of the processor 106(P), thereby deactivating processor 106(P). As previously described, the clock may be stopped in a variety of ways, such as by stopping a clock internal to the processor 106(P), blocking propagation of a clock signal to the processor 106(P), and so on.

Device Examples

FIGS. 5-12 illustrate some examples of various devices that can each be implemented as any form of a device to implement various embodiments of the previously described techniques. For example, any of the various devices can be implemented as a device that employs the above described techniques. The techniques may be employed within signal processing and/or control functionality of the devices, examples of which are as follows.

Figure 5:
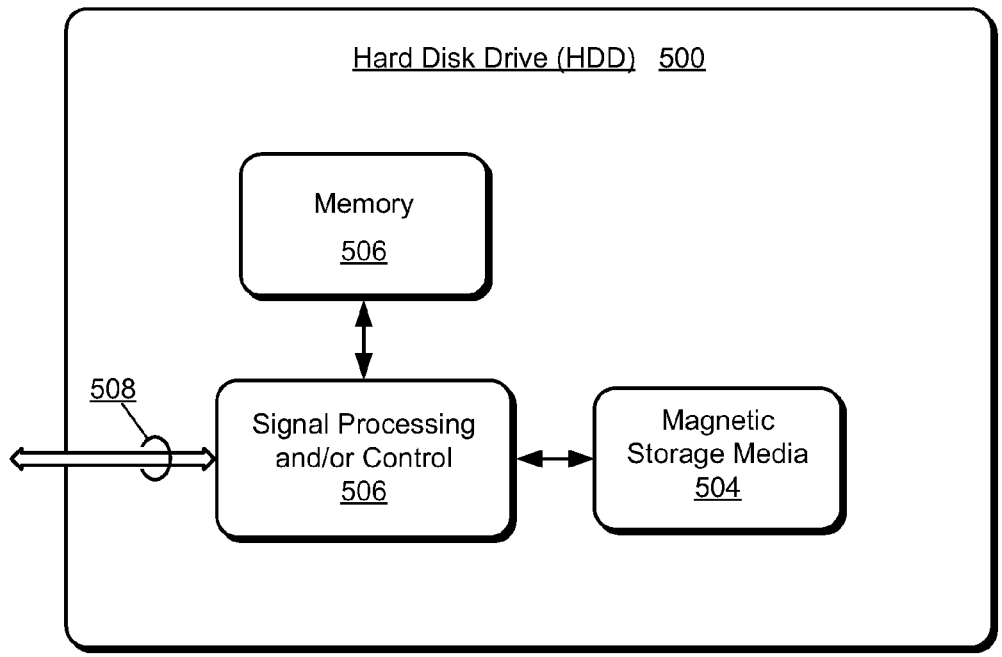
FIGS. 5-12 are illustrations of example devices that may employ the techniques described herein.

FIG. 5 illustrates an example device that may be embodied as a hard disk drive (HDD) 500, which includes signal processing and/or control circuit(s) generally identified at 502. The HDD 500 can also include a magnetic storage media 504 and/or a memory 506, such as random access memory (RAM), a low-latency nonvolatile memory such as flash memory, read only memory (ROM), and/or other suitable electronic data storage. In various implementations, the signal processing and/or control circuit(s) 502 can be implemented to process data (e.g., any of encoding, decoding, encryption, and/or decryption), perform data calculations, and/or format data. The data can be output to and/or received from at least the magnetic storage media 504 and/or the memory 506. In addition, the HDD 500 can communicate with a host device (not shown) such as a computer or mobile computing devices, such as a personal digital assistant, cellular phone, media or MP3 player, and/or other devices via one or more wired or wireless communication links 508.

Figure 6:
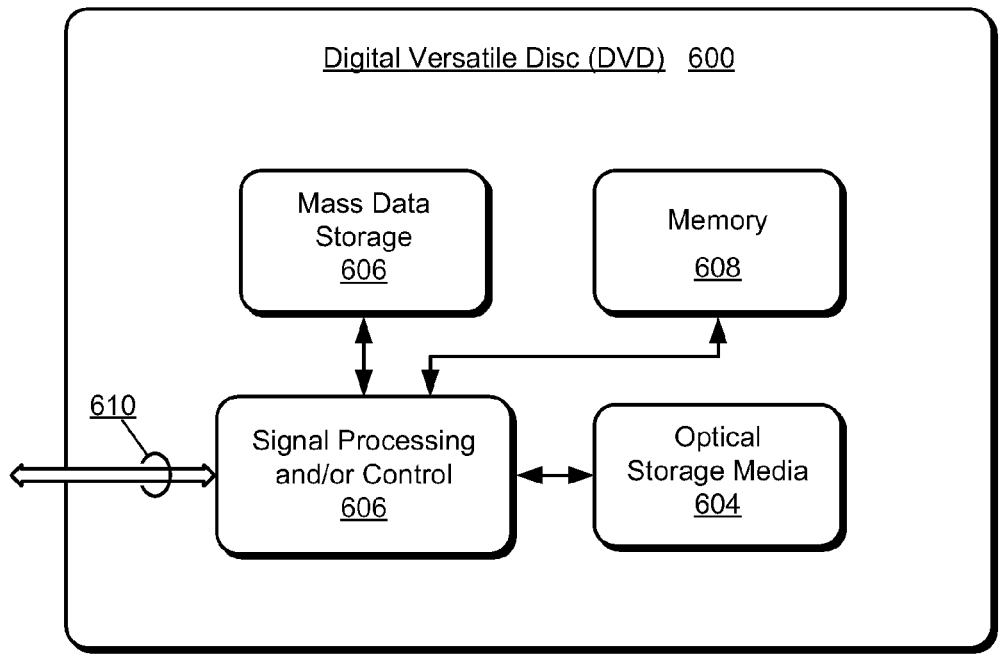

FIG. 6 illustrates an example device that may be embodied as a digital versatile disc (DVD) drive 600, which includes signal processing and/or control circuit(s) generally identified at 602. The DVD 600 can also include an optical storage media 604, mass data storage 606, and/or a memory 608, such as random access memory (RAM), a low-latency nonvolatile memory such as flash memory, read only memory (ROM), and/or other suitable electronic data storage. The mass data storage 606 can store data in a nonvolatile manner, and may include a hard disk drive (HDD) such as described with reference to FIG. 5, which may be a mini HDD that includes one or more platters having a diameter that is smaller than approximately 1.8 inches.

In various implementations, the signal processing and/or control circuit(s) 602 can be implemented to process data (e.g., any of encoding, decoding, encryption, and/or decryption), perform data calculations, format data, and/or any other signal processing functions associated with a DVD drive. The data can be written to and/or read from at least the optical storage media 604 and/or the memory 608. In addition, the DVD 600 can communicate with an output device (not shown) such as a computer, television, and/or other devices via one or more wired or wireless communication links 610.

Figure 7:
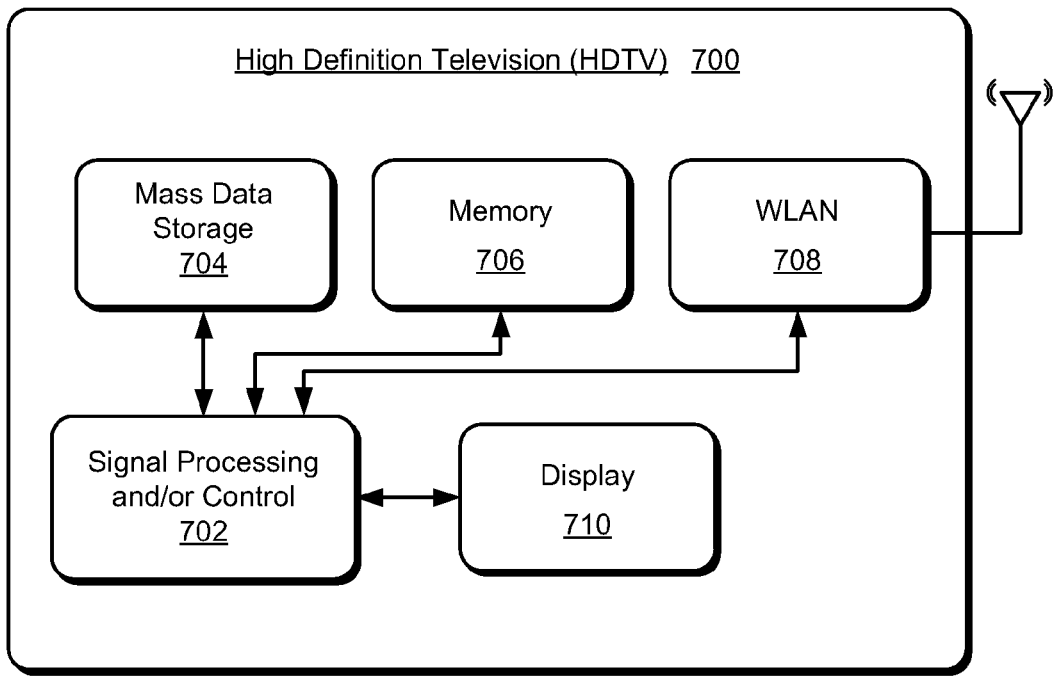

FIG. 7 illustrates an example device that may be embodied as a high definition television (HDTV) 700, which includes signal processing and/or control circuit(s) generally identified at 702. The HDTV 700 can also include mass data storage 704 and/or a memory 706, such as random access memory (RAM), a low-latency nonvolatile memory such as flash memory, read only memory (ROM), and/or other suitable electronic data storage. The mass data storage 704 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches.

In various implementations, the signal processing and/or control circuit(s) 702 can be implemented to process data (e.g., any of encoding, decoding, encryption, and/or decryption), perform data calculations, format data, and/or any other signal processing functions associated with an HDTV. The data can be output to and/or received from at least the memory 706. In addition, the HDTV 700 includes a wireless local area network (WLAN) interface 708 via which input signals can be received in either a wired or wireless format. HDTV output signals can be generated for a display 710.

Figure 8:
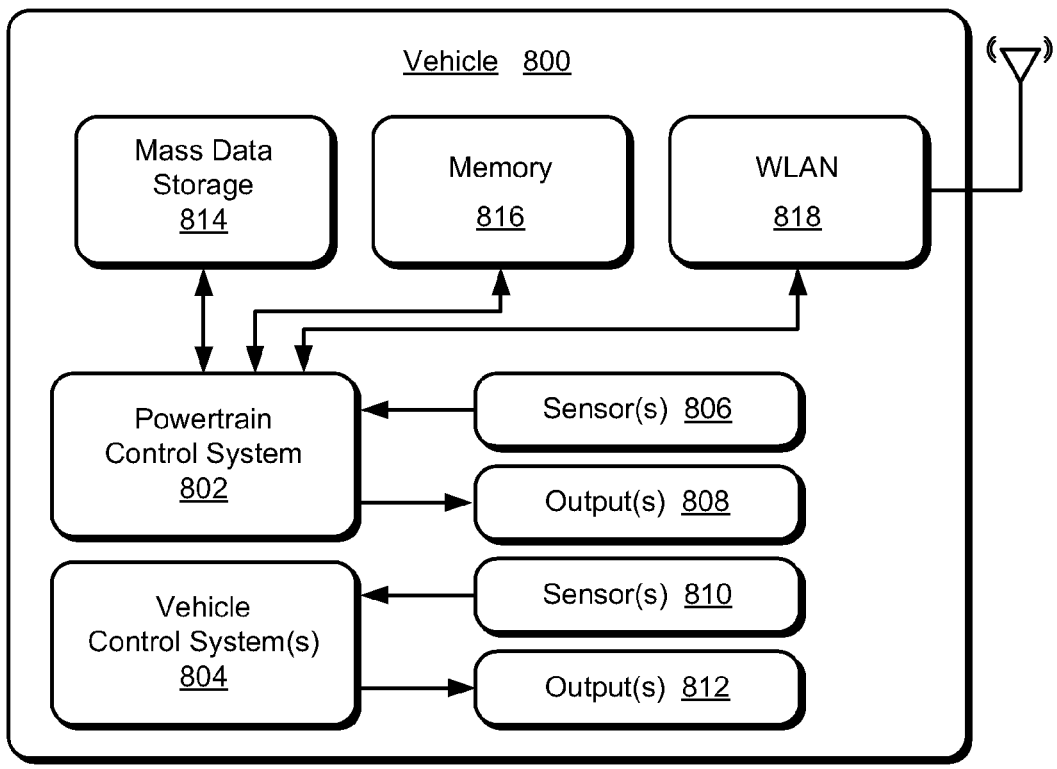

FIG. 8 illustrates an example device that may be embodied as a vehicle 800, which includes a powertrain control system 802 and, optionally, additional vehicle control system(s) 804. The powertrain control system 802 can receive data inputs from one or more sensors 806 such as temperature sensors, pressure sensors, rotational sensors, airflow sensors, and/or any other suitable sensors. The powertrain control system 802 can receive the data inputs and generate one or more output control signals 808, such as engine operating parameters, transmission operating parameters, and/or other control signals.

Additional control system(s) 804 may likewise receive data signals from one or more input sensors 810 and/or generate output control signals 812 to one or more output devices. In various implementations, a control system 804 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 800 can also include mass data storage 814 and/or a memory 816, such as random access memory (RAM), a low-latency nonvolatile memory such as flash memory, read only memory (ROM), and/or other suitable electronic data storage. The mass data storage 814 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches. In addition, vehicle 800 includes a wireless local area network (WLAN) interface 818 via which input signals can be received in either a wired or wireless format. The powertrain control system 802 also may support connections with a WLAN via the WLAN interface 818.

Figure 9:
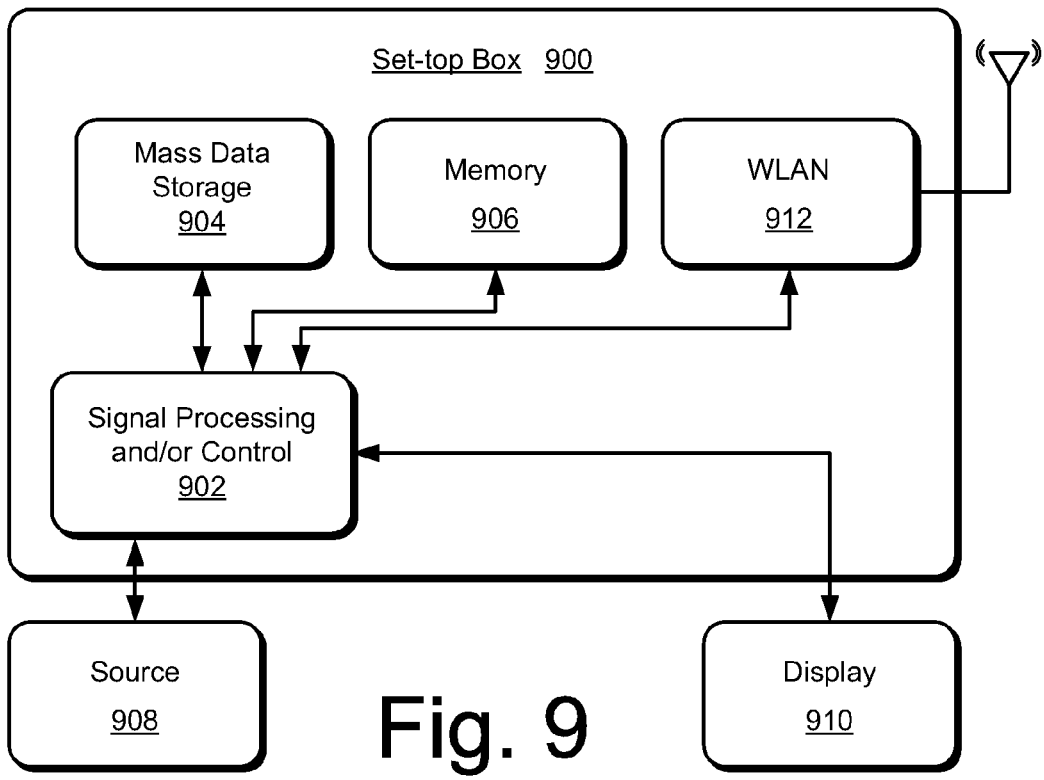

FIG. 9 illustrates an example device that may be embodied as a television set-top box 900, which includes signal processing and/or control circuit(s) generally identified at 902. The set-top box 900 can also include mass data storage 904 and/or a memory 906, such as random access memory (RAM), a low-latency nonvolatile memory such as flash memory, read only memory (ROM), and/or other suitable electronic data storage. The mass data storage 904 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches.

The set top box 900 can receive data signals from a source 908, such as a broadband source, and can then output standard and/or high definition audio/video signals suitable for a display 910, such as a television, monitor, and/or other video and/or audio output devices. In various implementations, the signal processing and/or control circuit(s) 902 can be implemented to process data (e.g., any of encoding, decoding, encryption, and/or decryption), perform data calculations, format data, and/or any other signal processing functions associated with a television set-top box. The data can be output to and/or received from at least the memory 906 and/or the source 908. In addition, the set-top box 900 includes a wireless local area network (WLAN) interface 912 via which input signals can be received in either a wired or wireless format. The set-top box 900 may also support connections with a WLAN via the WLAN interface 912.

Figure 10:
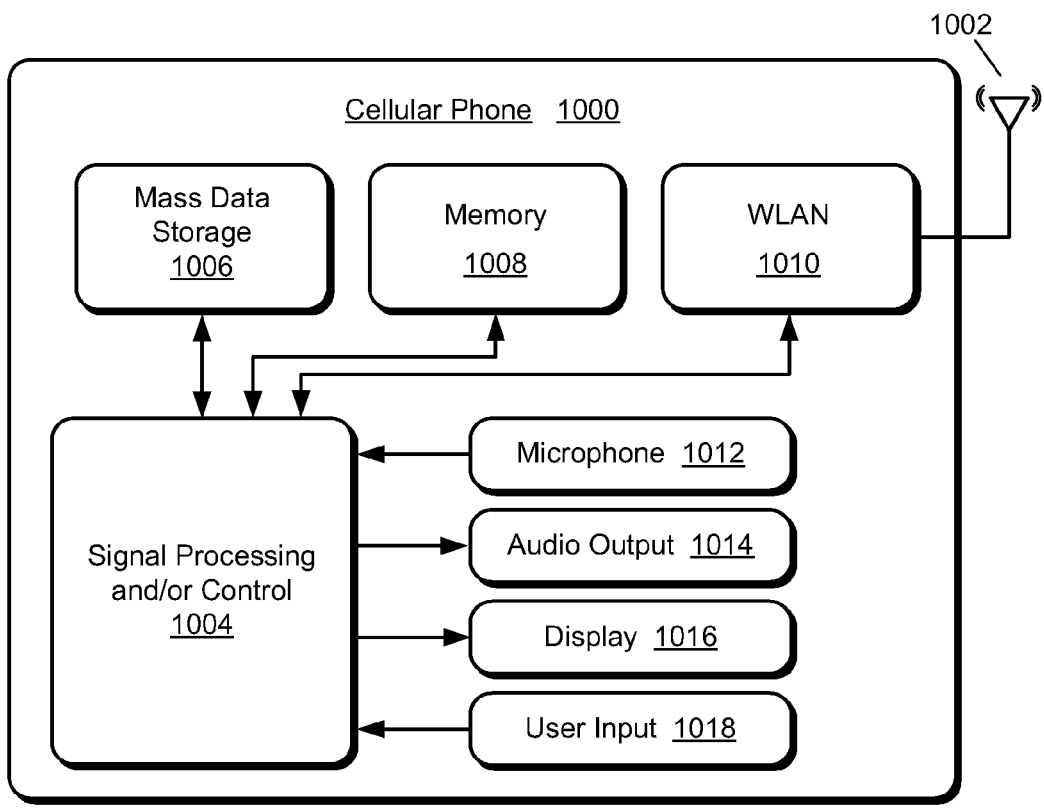

FIG. 10 illustrates an example device that may be embodied as a cellular phone 1000, which includes a cellular antenna 1002 and signal processing and/or control circuit(s) generally identified at 1004. The cellular phone 1000 can also include mass data storage 1006 and/or a memory 1008, such as random access memory (RAM), a low-latency nonvolatile memory such as flash memory, read only memory (ROM), and/or other suitable electronic data storage. The mass data storage 1006 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches.

Figure 11:
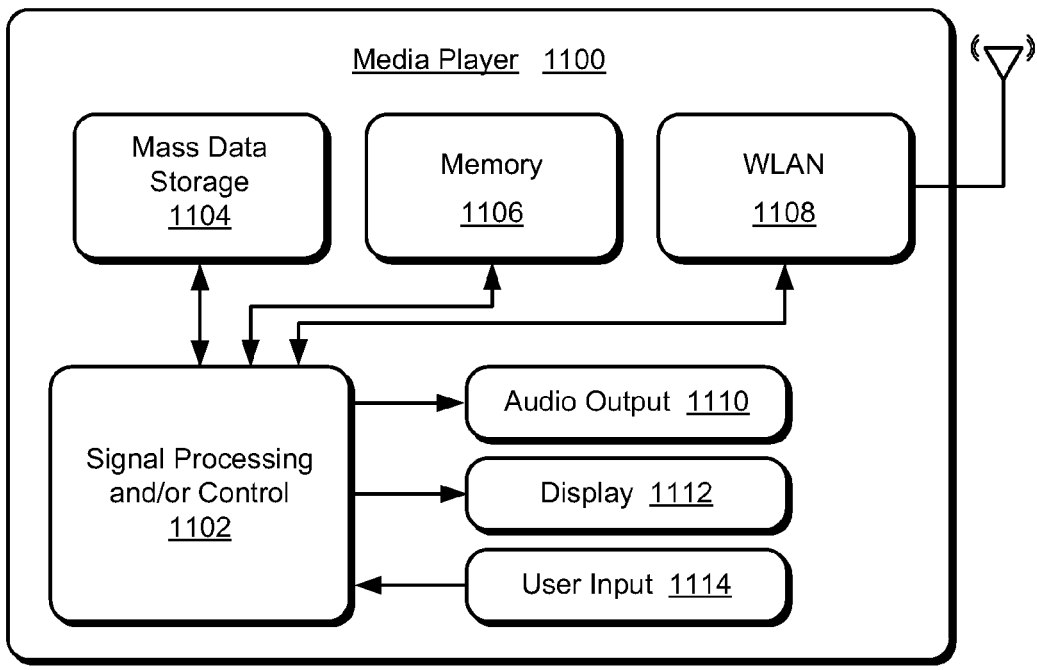

In various implementations, the signal processing and/or control circuit(s) 1004 can be implemented to process data (e.g., any of encoding, decoding, encryption, and/or decryption), perform data calculations, format data, and/or any other signal processing functions associated with a cellular phone. The data can be output to and/or received from at least the memory 1008. In addition, the cellular phone 1000 includes a wireless local area network (WLAN) interface 1010 via which input signals can be received in a wireless format. The cellular phone 1000 may also support connections with a WLAN via the WLAN interface 1010. In some implementations, the cellular phone 1000 can include a microphone 1012, an audio output 1014 such as a speaker and/or audio output jack, a display 1016, and/or an input device 1018 such as a keypad, pointing device, voice actuation, and/or other input device. D FIG. 11 illustrates an example device that may be embodied as a media player 1100, which includes signal processing and/or control circuit(s) generally identified at 1102. The media player 1100 can also include mass data storage 1104 and/or a memory 1106, such as random access memory (RAM), a low-latency nonvolatile memory such as flash memory, read only memory (ROM), and/or other suitable electronic data storage. The mass data storage 1104 can store data, such as compressed audio and/or video content, in a nonvolatile manner. In some implementations, compressed audio files include files that are compliant with an MP3 format or other suitable compressed audio and/or video formats. The mass data storage 1104 may include an optical storage media as described with reference to FIG. 6, and/or a drive as described with reference to FIG. 5, which may be a mini HDD that includes one or more platters having a diameter that is smaller than approximately 1.8 inches.

In various implementations, the signal processing and/or control circuit(s) 1102 can be implemented to process data (e.g., any of encoding, decoding, encryption, and/or decryption), perform data calculations, format data, and/or any other signal processing functions associated with a media player. The data can be output to and/or received from at least the memory 1106. In addition, the media player 1100 includes a wireless local area network (WLAN) interface 1108 via which input signals can be received in either a wired or wireless format. The media player 1100 may also support connections with a WLAN via the WLAN interface 1108. In some implementations, the media player 1100 can include an audio output 1110 such as a speaker and/or audio output jack, a display 1112, and/or an input device 1114 such as a keypad, touchpad, pointing device, voice actuation, and/or other input device. In various implementations, media player 1100 may employ a graphical user interface (GUI) that typically includes menus, drop down menus, icons, and/or a point-and-click interface via display 1112 and/or user input 1114.

Figure 12:
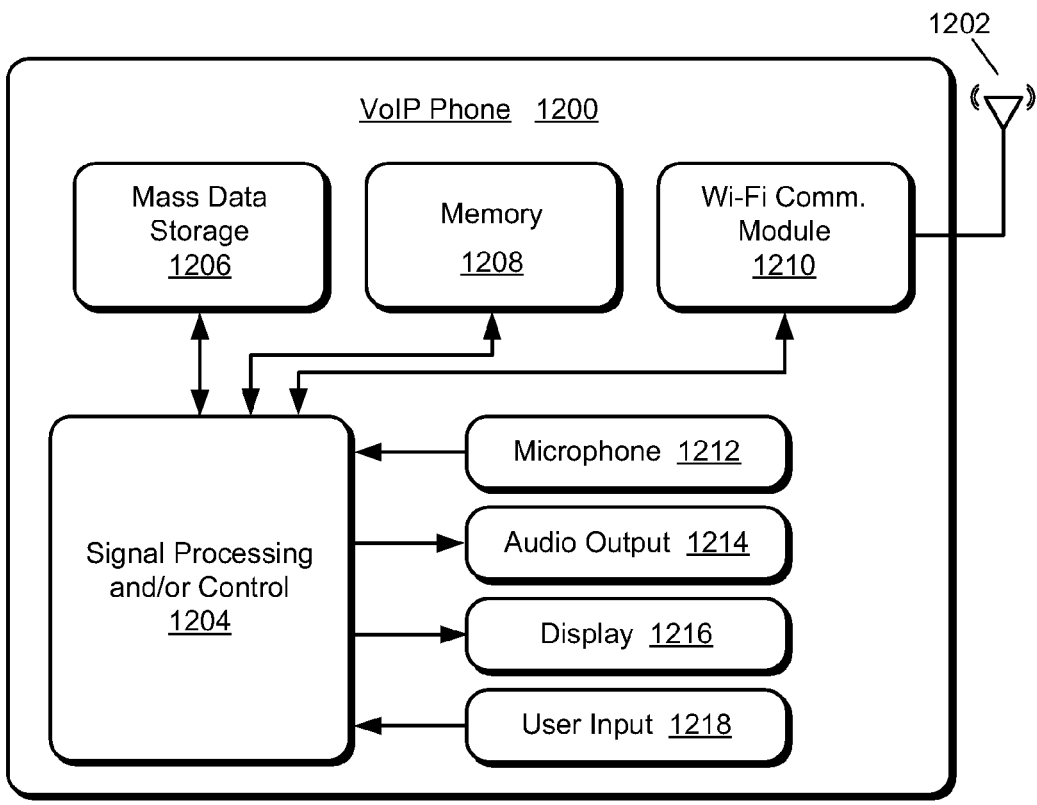

FIG. 12 illustrates an example device that may be embodied as a Voice over Internet Protocol (VoIP) phone 1200, which includes an antenna 1202 and/or is implemented in connection with a VoIP box that enables a conventional telephone to be plugged in and utilized with VoIP technology. The VoIP phone 1200 also includes signal processing and/or control circuit(s) generally identified at 1204. The VoIP phone 1200 can also include mass data storage 1206 and/or a memory 1208, such as random access memory (RAM), a low-latency nonvolatile memory such as flash memory, read only memory (ROM), and/or other suitable electronic data storage. The mass data storage 1206 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches.

In various implementations, the signal processing and/or control circuit(s) 1204 can be implemented to process data (e.g., any of encoding, decoding, encryption, and/or decryption), perform data calculations, format data, and/or any other signal processing functions associated with a VoIP phone. The data can be output to and/or received from at least the memory 1208. In addition, the VoIP phone 1200 includes a Wireless Fidelity (Wi-Fi) communication module 1210 via which communication links with a VoIP network can be established. In some implementations, the VoIP phone 1200 can include a microphone 1212, an audio output 1214 such as a speaker and/or audio output jack, a display 1216, and/or an input device 1218 such as a keypad, pointing device, voice actuation, and/or other input device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    a buffer to receive and store packet data, the packet data received from a single channel of packet data;
    two or more thresholds defined for the buffer, each threshold defining a respective amount of storage space for the buffer;
    a plurality of processors to process the packet data stored in the buffer, each of the plurality of processors associated with a different one of the thresholds; and
    a processor control module, the processor control module capable of activating one of the plurality of processors when one of the corresponding thresholds is exceeded to process the packet data from the buffer.

2. The apparatus as described in claim 1, further comprising an additional processor that is not associated with one of the thresholds.

3. The apparatus as described in claim 2, wherein a number of processors is not equal to a number of the two or more thresholds.

4. The apparatus as described in claim 1, wherein the processor control module is capable of deactivating one or more of the plurality of processors when the amount of packet data stored in the buffer becomes less than a corresponding said threshold.

5. The apparatus as described in claim 1, wherein the processor control module is capable of activating at least two of the plurality of processors when two of the corresponding thresholds are exceeded.

6. The apparatus as described in claim 1, wherein the buffer is configured as a first in/first out (FIFO) buffer.

7. The apparatus as described in claim 1, wherein the buffer is a logical buffer that includes a plurality of buffer devices.

8. The apparatus as described in claim 1, further comprising an additional processor designated as a parent such that it is not activated or deactivated based on the two or more thresholds; and
    wherein the plurality of processors are designated as children such that they are activated or deactivated based on the corresponding thresholds.

9. The apparatus as described in claim 1, wherein:
    at least one of the plurality of processors is associated with a clock control module that is configured to control operation of a clock of the processor; and
    the processor control module activates the one of the plurality of processors using the clock control module.

10. The apparatus as described in claim 1, wherein the buffer, the plurality of processors and the processor control module are formed on a single integrated circuit.

11. A method comprising:
    determining, by a processor control module, that an amount of packet data stored in a buffer exceeds one of two or more thresholds defined for the buffer, the packet data received from a single channel of packet data, each of the thresholds defining a respective amount of data storage space for the buffer; and
    managing, by the processor control module, how many of a plurality of processors are to be used to process the packet data from the buffer by activating one of the plurality of processors that corresponds to the threshold.

12. The method as described in claim 11, wherein an additional processor used to process packet data from the buffer does not correspond to one of the thresholds.

13. The method as described in claim 11, wherein:
    the buffer is configured as a first in/first out (FIFO) buffer; and
    the packet data is stored in the buffer as a plurality of data packets or as fragments of data packets.

14. The method as described in claim 11, wherein the buffer is a logical buffer that includes a plurality of buffer devices.

15. The method as described in claim 11, wherein:
    an additional processor is designated as a parent such that it is not activated or deactivated based on the two or more thresholds; and
    the plurality of processors are designated as children such that they are activated or deactivated based on the corresponding thresholds.

16. The method as described in claim 11, wherein:
    at least one said processor is associated with a clock control module that is configured to control operation of a clock of the processor; and
    the managing is performed, at least in part, using the clock control module.

17. The method as described in claim 11, wherein the buffer, the plurality of processors and the processor control module are formed on a single integrated circuit.

18. A method comprising:
    determining that one of two or more thresholds of a buffer is exceeded by an amount of packet data stored by the buffer, each of the thresholds defining a respective amount of storage space of the buffer, the packet data received from a single channel of packet data; and
    responsive to the determining, causing a processor control module to activate an additional processor associated with the exceeded threshold to process at least a portion of the packet data that exceeds the exceeded threshold.

19. The method as described in claim 18, wherein the buffer, the additional processor and the processor control module are formed on a single integrated circuit.

20. The method as described in claim 18, wherein the threshold defines a particular amount of storage space of the buffer that is less than a total amount of storage space of the buffer that is available to store packet data.

21. The method as described in claim 18, wherein the buffer is a logical buffer that is formed using a plurality of buffer devices.

22. The method as described in claim 18, wherein the activating is performed using a clock control module that is configured to enable one or more clocks for the one or more additional processors.

23. The method as described in claim 18, further comprising causing the processor control module to deactivate the additional processor when the amount of packet data stored by the buffer does not exceed the threshold.

24. A system comprising:
    means for buffering packet data received from a single channel of packet data, the buffering means having two or more thresholds each defining a respective amount of storage space for the buffering means;

a plurality of means for processing the packet data, each being communicatively coupled to the buffering means and associated with a different one of the thresholds; and means for activating one of the plurality of processing means when one of the corresponding thresholds is exceeded to process the packet data from the buffering means.

25. The system as described in claim 24, further comprising means for deactivating one of the plurality of processing means when the corresponding threshold is no longer exceeded.

26. The system as described in claim 24, wherein:

an additional processing means is designated as a parent such that it is not activated or deactivated based on the two or more thresholds; and the plurality of processor means are designated as children such that they are activated or deactivated based on the corresponding thresholds.

27. The system as described in claim 24, wherein:

at least one of the plurality of processing means is associated with means for controlling operation of a clock of the processing means; and the activating means is to manage the plurality of processing means to process the packet data using the controlling means.

* * * * *